(No Model.) 2 Sheets—Sheet 2.
J. T. MEATS.
SELF STRIPPING MECHANISM FOR CARDING MACHINES.
No. 319,107. Patented June 2, 1885.
Fig: 2.
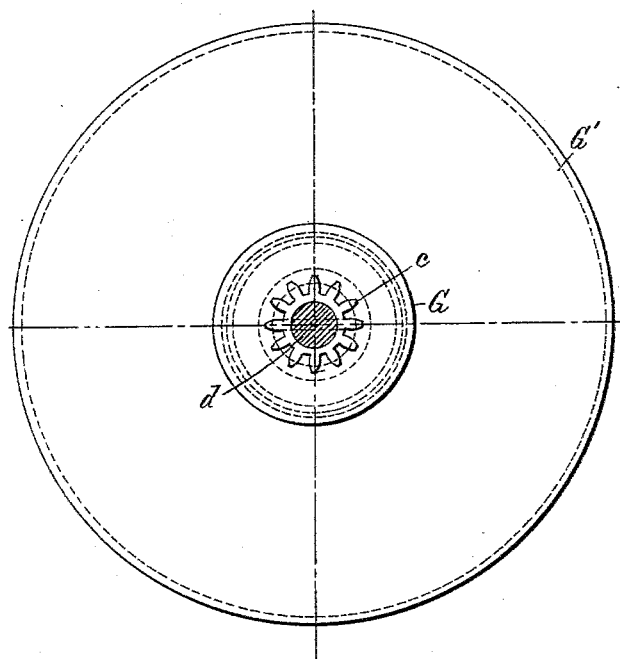
Fig: 3.
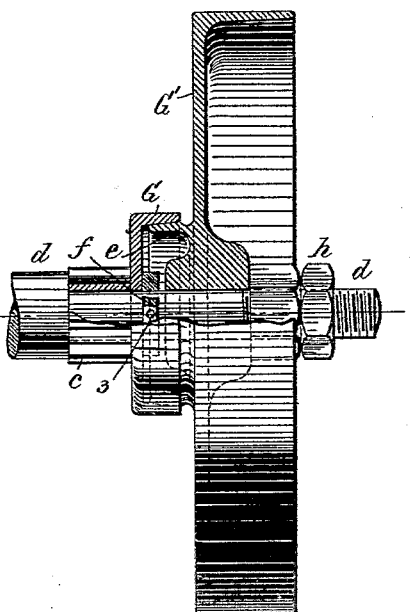
Witnesses.
Arthur Lippitten.
John F. C. Prinkert.
Inventor.
John T. Meats.
by Crosby & Gregory attys.

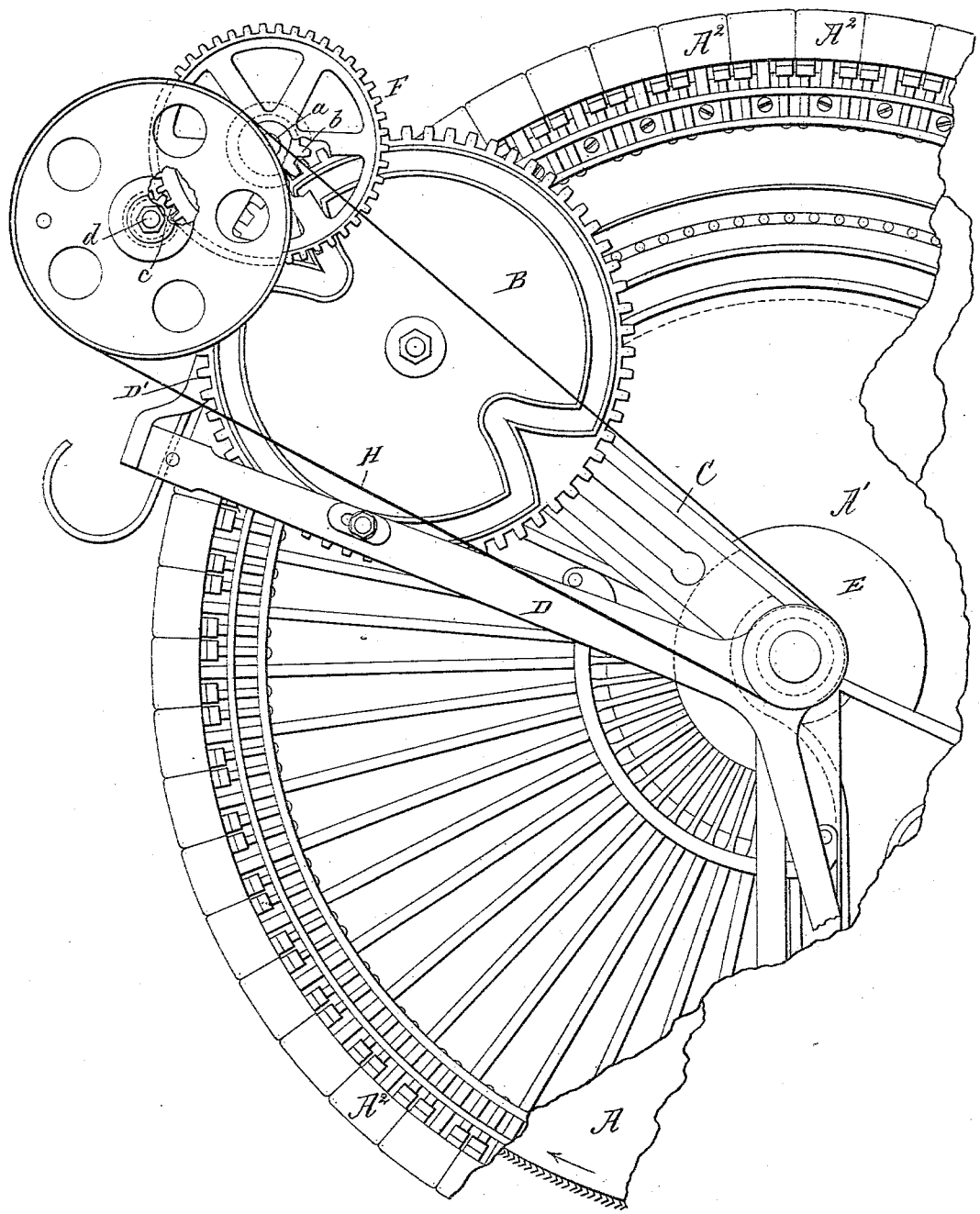

UNITED STATES PATENT OFFICE.

JOHN T. MEATS, OF TAUNTON, MASSACHUSETTS.

SELF-STRIPPING MECHANISM FOR CARDING-MACHINES.

SPECIFICATION forming part of Letters Patent No. 319,107, dated June 2, 1885.

Application filed August 25, 1884. (No model.)

*To all whom it may concern:*

Be it known that I, JOHN T. MEATS, of Taunton, county of Bristol, State of Massachusetts, have invented an Improvement in Self-Stripping Mechanism for Carding-Machines, of which the following description, in connection with the accompanying drawings, is a specification, like letters on the drawings representing like parts.

This invention, relating to self-stripping carding-machines, has for its object to prevent breaking of the parts of the stripping mechanism should the movement of the said mechanism be for any cause unduly obstructed.

The stripper-actuating cam-wheel in carding-machines as now constructed is driven by gearing from a pulley on a stud mounted on the traveling frame. This pulley is driven by a belt, and a gear moving in unison with the pulley causes the stripper-moving cam-wheel to be rotated as long as the pulley is driven by the belt. It frequently happens that the flats fail to arrive in position at the proper time, or get caught; and also it is not infrequent that the gearing becomes obstructed by waste, &c., which results in breaking the parts of the stripping mechanism, most frequently the cam-wheels or their flanges or the stripper-carrying arms. To overcome these difficulties and avoid breakage of parts of the stripping mechanism when for any reason the proper movement thereof is obstructed or interfered with, I have provided the stripping mechanism with a clutch, which, before the application to the stripping mechanism of such an amount of working strain as would break the said parts, will slip and permit the stripping mechanism to stop while the part of the clutch driven by the belt continues in motion. In other words, I have interposed a clutch between the belt-driven pulley of the stripping mechanism and the parts of the stripping mechanism driven by a gear set in motion by the said pulley, so that the said clutch gives or yields to any obstruction which would ordinarily break the stripping mechanism.

My invention consists, essentially, in the combination, with the traveling frame of a stripping mechanism and a cam-wheel which actuates the arms of the stripper, of a clutch and intermediate gearing for driving the said cam-wheel, whereby on the obstruction of the stripping mechanism the said clutch may slip, and thus avoid breakage of parts.

Figure 1 in side elevation represents a sufficient portion of a self-stripping carding-machine to enable my invention to be understood. Fig. 2 is a rear side elevation of the belt-driver clutch-pulley that drives the usual cam-wheel, the said pulley being cut off from the machine; and Fig. 3 is an enlarged edge elevation of the clutch-pulley broken off from the other parts, and broken out to show its interior construction.

The cylinder A, the frame A' of the carding mechanism, the flats A², the cam-wheel B, toothed at its periphery, the traveling frame C, the arms D, carrying the stripper D', the pulley E, the shaft $a$, extended across the traveling frame from side to side, the toothed gear F, and pinion $b$ thereon, and the toothed gear $c$, loose on the stud $d$, which is fixed to an ear on the traveling frame C, are all substantially as in the carding-machines now made and known as the "Foss and Pevey" card, it being substantially as represented in United States Patent No. 166,089, dated July 27, 1875, to which reference may be had; but herein the cam-wheel is shown as having its groove shaped to operate the arms D twice at each rotation; but that also is common.

The devices thus far described being common and their operation being well understood, I need not herein further specifically describe them.

Instead of attaching the pinion $c$ directly to the belt-driven pulley, as heretofore common, I have attached it to or made it integral with one half or part, G, of a clutch, the other part, G', of the clutch receiving at its periphery the usual driving-belt, H, actuated from the pulley E, located at the axis of the main cylinder A.

The portion G' of the clutch has a tapering or conical hub-like projection, $e$, which is shown as entering a conical or tapering recess made in the part G of the clutch attached to the pinion $c$. The amount of friction between the conical or tapering portions of the clutch parts G G', which are in contact, is determined by a nut, $h$, which is turned upon the screw-threaded part of the stud $d$.

The clutch part G, with its attached pinion, is retained upon the stud $d$ by a collar, $f$, which is attached to the stud inside the part G by a pin, 3. The belt H drives the clutch parts G G' and pinion $c$, and actuates the stripping mechanism in the usual manner, so long as all the parts are in working condition and position; but in the case of obstruction to the correct movement of the stripping mechanism the clutch part G' slips on the part G, thus permitting the stripping mechanism to remain at rest while the belt H and the part G' continue to move.

Instead of the particular clutch herein shown I may employ any other usual or well-known form of clutch, which, after the application to it of a certain amount of strain, will permit one part thereof to turn or slip upon the other.

I have herein shown my improvements as applied to the particular mechanism of what is known as the "Foss and Pevey" card referred to; but I desire it to be understood that the application of a clutch to drive the shaft that actuates the gearing which gives motion to the cam wheels or devices for operating the arms of the stripper of any carding-machine would be, as I consider, within the scope of my invention.

I claim—

The stripper, its arms, the cam-wheel for operating the said arms, the pinion $c$, a driving-pulley therefor, and means to connect the pinion with and actuate the cam-wheel, combined with a friction-clutch interposed between the said pinion and its driving-pulley, to hold the two in operative connection while running under ordinary strain, and to slip under extraordinary strain to stop the pinion, substantially as and for the purpose set forth.

In testimony whereof I have signed my name to this specification in the presence of two subscribing witnesses.

JOHN T. MEATS.

Witnesses:
   G. W. GREGORY,
   J. H. LANGE.